US009162206B2

United States Patent
Tammera

(10) Patent No.: US 9,162,206 B2
(45) Date of Patent: Oct. 20, 2015

(54) REACTOR BED COMPONENT FOR SECURING RIGID ASSEMBLIES

(71) Applicant: Robert Frank Tammera, Warrenton, VA (US)

(72) Inventor: Robert Frank Tammera, Warrenton, VA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 91 days.

(21) Appl. No.: 14/097,827

(22) Filed: Dec. 5, 2013

(65) Prior Publication Data

US 2015/0157999 A1    Jun. 11, 2015

(51) Int. Cl.
*B01J 19/32* (2006.01)
*B01J 8/18* (2006.01)
(Continued)

(52) U.S. Cl.
CPC ...... *B01J 8/1872* (2013.01); *B01J 8/34* (2013.01); *C10G 11/185* (2013.01); *B01J 2208/0084* (2013.01); *B01J 2208/00884* (2013.01); *B01J 2208/00938* (2013.01)

(58) Field of Classification Search
CPC ....... B01J 8/18–8/189; B01J 8/20; B01J 8/22; B01J 8/24; B01J 8/34; B01J 8/44; B01J 19/32; B01J 19/325; B01J 2219/30; B01J 2219/302; B01J 2219/30276–2219/30296; C10G 2/30; C10G 2/32; C10G 2/34; C10G 2/342; C10G 2/344; C10G 3/34; C10G 3/35; C10G 3/37; C10G 25/06; C10G 25/09; C10G 45/02; C10G 45/14; C10G 45/20; C10G 47/24; C10G 47/30; C10G 49/10; C10G 49/16
See application file for complete search history.

(56) References Cited

U.S. PATENT DOCUMENTS 2,505,851 A    5/1950    Wobker et al.
2,955,987 A    10/1960   Mackay et al.
(Continued)

FOREIGN PATENT DOCUMENTS

EP    0404107 A1    12/1990
FR    2450626 A1    10/1980
(Continued)

OTHER PUBLICATIONS

PCT Application PCT/US2014/061308, Communication from the International Searching Authority received in co-pending, co-owned related patent application (Applicant's Reference No.) 2013EM261 (U.S. Appl. No. 14/097,729, Form PCT/ISA/220, dated Feb. 24, 2015, 12 pages.
(Continued)

*Primary Examiner* — Natasha Young
(74) *Attorney, Agent, or Firm* — Andrew T. Ward

(57) ABSTRACT

Reactor bed component includes a foundation grate, a rigid structure and a fastener. The foundation grate has support plates spaced apart from each other by a distance and having a height with each support plate disposed at an angle. The rigid structure has first structure plates spaced apart by a multiple of the distance and disposed at the angle, and second structure plates secured to and disposed at an opposing angle. Each second structure plate has a horizontal extent to engage an upper edge of a corresponding support plate, and a number of the first structure plates have a length extending below the horizontal extent in overlapping relation with adjacent support plates to prevent horizontal movement of the rigid structure relative the foundation grate in a first direction. The fastener is disposed to secure the rigid structure to the grate against movement in a second direction opposite the first direction.

13 Claims, 7 Drawing Sheets

(51) Int. Cl.
  *B01J 8/34* (2006.01)
  *C10G 11/18* (2006.01)
  *B01J 8/20* (2006.01)
  *B01J 8/22* (2006.01)
  *B01J 8/24* (2006.01)
  *B01J 8/44* (2006.01)
  *C10G 2/00* (2006.01)
  *C10G 3/00* (2006.01)
  *C10G 25/06* (2006.01)
  *C10G 45/02* (2006.01)
  *C10G 47/24* (2006.01)
  *C10G 49/10* (2006.01)

(56) References Cited

U.S. PATENT DOCUMENTS

| | | |
|---|---|---|
| 3,099,538 A | 7/1963 | Kronig et al. |
| 3,169,835 A | 2/1965 | Huntley et al. |
| 3,653,845 A | 4/1972 | Moravec |
| 3,959,419 A | 5/1976 | Kitterman |
| 3,969,447 A | 7/1976 | Glitsch et al. |
| 4,072,736 A | 2/1978 | Fattinger |
| 4,115,929 A | 9/1978 | Staub et al. |
| 4,352,378 A | 10/1982 | Bergmann |
| 4,497,751 A | 2/1985 | Pluss |
| 4,497,753 A | 2/1985 | Streiff |
| 4,676,934 A | 6/1987 | Seah |
| 4,744,928 A * | 5/1988 | Meier .............. 261/95 |
| 4,883,646 A * | 11/1989 | Zardi .............. 422/311 |
| 5,032,156 A | 7/1991 | Luder |
| 5,069,830 A | 12/1991 | Moore |
| 5,320,428 A | 6/1994 | Streiff |
| 5,378,063 A | 1/1995 | Tsukada |
| 5,484,203 A | 1/1996 | King |
| 5,510,061 A | 4/1996 | Moore |
| 5,605,399 A | 2/1997 | King |
| 5,620,252 A | 4/1997 | Maurer |
| 5,716,585 A | 2/1998 | Senegas |
| 5,756,048 A | 5/1998 | Zardi et al. |
| 5,916,529 A | 6/1999 | Scheuerman |
| 5,964,528 A | 10/1999 | Suess |
| 6,032,932 A | 3/2000 | Sixsmith |
| 6,217,208 B1 | 4/2001 | Schuchardt |
| 6,321,567 B1 | 11/2001 | Lockett |
| 6,427,985 B1 | 8/2002 | Kaibel |
| 6,550,960 B2 | 4/2003 | Catalfamo |
| 6,595,679 B2 | 7/2003 | Schuchardt |
| 6,722,639 B2 | 4/2004 | Ender |
| 6,881,387 B1 | 4/2005 | Jacobs et al. |
| 7,077,561 B2 | 7/2006 | Streiff |
| 7,332,132 B2 | 2/2008 | Hedrick |
| 7,988,931 B2 * | 8/2011 | Klinger et al. .............. 422/311 |
| 8,349,170 B2 | 1/2013 | Tammera et al. |
| 2001/0051119 A1 | 12/2001 | Overbeek |
| 2005/0126107 A1* | 6/2005 | Colman et al. .............. 52/673 |
| 2007/0081420 A1 | 4/2007 | Hempel |
| 2009/0092527 A1 | 4/2009 | Klinger et al. |
| 2010/0213625 A1 | 8/2010 | Raynal |
| 2011/0240526 A1 | 10/2011 | Tammera et al. |
| 2011/0309536 A1 | 12/2011 | Ausner |
| 2011/0315603 A1 | 12/2011 | Skoulidas et al. |
| 2012/0106290 A1 | 5/2012 | Meijer et al. |
| 2013/0172172 A1 | 7/2013 | Gamas-Castellanos et al. |

FOREIGN PATENT DOCUMENTS

| | | |
|---|---|---|
| GB | 607284 | 8/1948 |
| GB | 845369 A | 8/1960 |
| GB | 2061746 A | 5/1981 |
| WO | 2014081545 A1 | 5/2014 |

OTHER PUBLICATIONS

PCT Application No. PCT/US2014/061307, Communication from the International Searching Authority, Form PCT/ISA/210, dated Feb. 24, 2015, 13 pages.

* cited by examiner

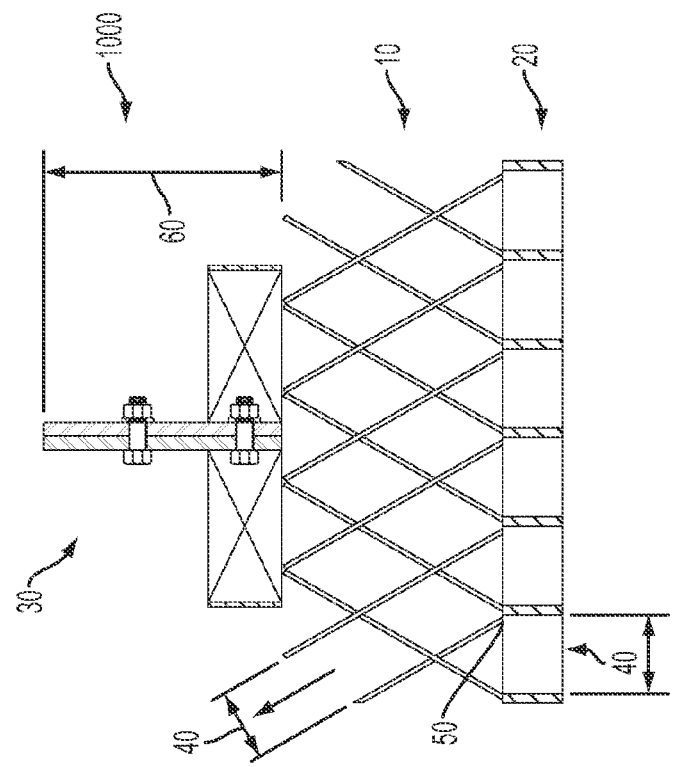
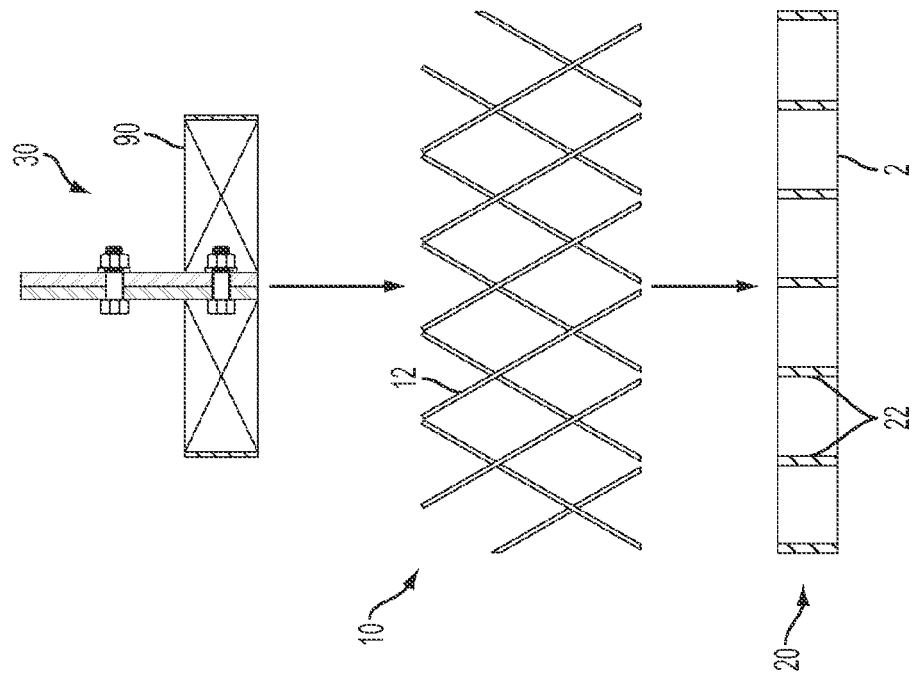
FIG. 2A PRIOR ART
FIG. 2B PRIOR ART

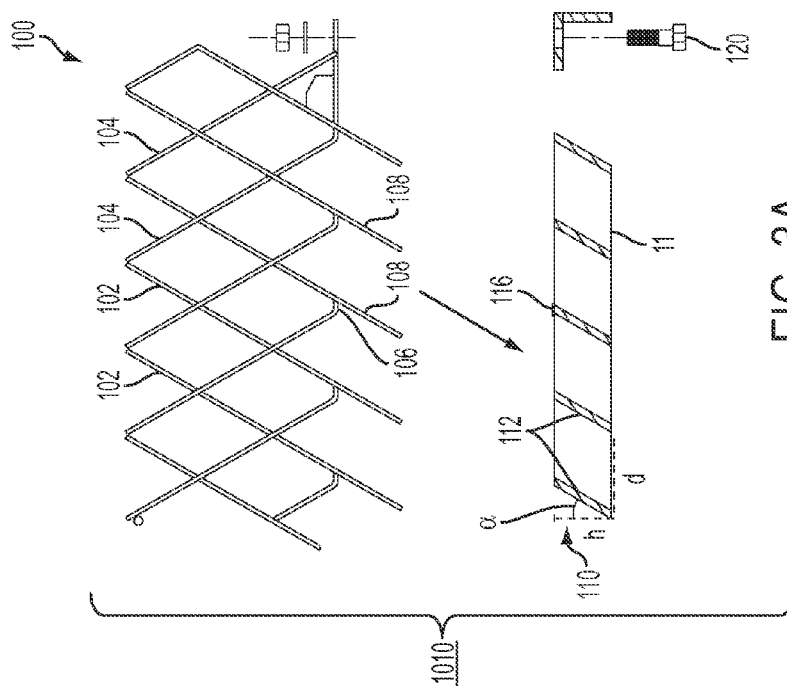
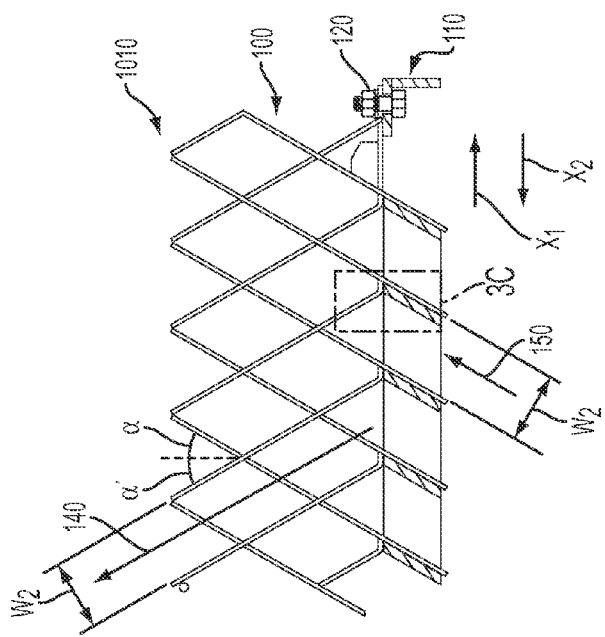
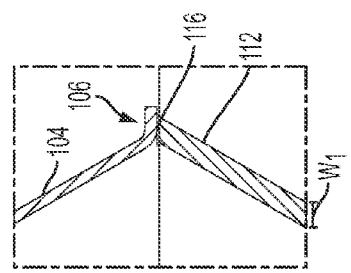

REACTOR BED COMPONENT FOR SECURING RIGID ASSEMBLIES

BACKGROUND

1. Field of the Disclosed Subject Matter

The present disclosed subject matter relates to a reactor bed component, and particularly systems and methods to secure rigid assemblies within a multi-phase reaction bed vessel.

2. Description of Related Art

Fluid catalytic cracking (FCC) processes are used for petroleum and petrochemical conversion processes. These processes can provide efficient and selective catalytic cracking of hydrocarbon-containing feedstock. For example, small catalyst particles can be fluidized and mixed with a feedstock by intimate contact under thermally active conditions to generally produce lower molecular weight "cracked" products. FCC processes are beneficial due at least in part to the ability to continuously recycle and regenerate the spent catalysts and to process large volumes of hydrocarbon-containing feedstock.

In FCC processes, higher molecular weight feeds contact fluidized catalyst particles, most advantageously in the riser reactor of the fluidized catalytic cracking unit. Contact between feed and catalyst can be controlled according to the type of product desired. In catalytic cracking of the feed, reactor conditions, including temperature and catalyst circulation rate, can be adjusted to increase formation of the desired products and reduce the formation of less desirable products, such as light gases and coke.

Various fluidized catalytic cracking reactor riser and reactor vessel designs can be utilized. For example, certain fluidized catalytic cracking reactors utilize a short contact-time cracking configuration. With this configuration, the catalyst contacts the fluidized catalytic cracker feedstream for a limited time in order to reduce excessive cracking, which can result in the increased production of less valued products such as light hydrocarbon gases, as well as increased coking deposition on the cracking catalysts.

Certain fluidized catalytic cracking configurations utilize a reactor riser cracking configuration wherein the catalyst can contact the fluidized catalytic cracker feedstock in a reactor riser, and the catalyst and the hydrocarbon reaction products can be separated shortly after the catalyst and hydrocarbon mixture flows from the reactor riser into the fluidized catalytic cracking reactor. Many different fluidized catalytic cracking reactor designs are known. For example, certain designs utilize mechanical cyclones internal to the reactor to separate the catalyst from the hydrocarbon reactor products. This separation process can reduce post-riser reactions between the catalyst and the hydrocarbons as well as separate the cracked hydrocarbon products for further processing from the spent catalyst, which can be regenerated and reintroduced into the reaction process.

Catalyst separated from the cracked hydrocarbon products in the FCC reactor can be considered as "spent catalyst" until such time as the catalyst can typically be sent to an FCC regenerator vessel and regenerated into a "regenerated catalyst." In such a process, the spent catalyst can flow through a gaseous stream stripping section to remove most or all of the hydrocarbon layer remaining on the catalyst after separation from the bulk of the FCC products. This "stripped" catalyst can then be sent via a spent catalyst riser to an FCC regenerator to oxidize the spent catalyst and burn away the remaining hydrocarbons and coke to convert the spent catalyst to regenerated catalyst.

The stripping section can include one or more rigid structures, known as "structured packing" or "stripping sheds." These rigid structures can be formed from flat metal plates or gauzes, which can be arranged in predetermined patterns to create flow paths and provide a desired surface area therethrough to increase the amount of gaseous stream that can contact the catalyst therein. The stripping section can further include one or more support structures to prevent movement of the rigid structures due to pressure from the gaseous stream as well as other forces within the reaction bed vessel. However, conventional support structures can impede the flow paths of the catalyst and gaseous stream through the rigid structures and create undesired pressure drops in the system.

As such, there remains a need for an improved reactor bed component, and systems and methods to secure rigid structures in a reaction bed vessel to withstand dynamic turbulence therein, as well as to provide improved flow paths with reduced pressure drops to increase the flow of catalyst through the reaction system.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a reactor bed component. The reactor bed component includes a foundation grate having a plurality of substantially parallel support plates equally spaced apart from each other by a distance d. The plurality of substantially parallel support plates have a vertical height h, with each support plate disposed at an angle $\alpha$ relative to vertical. The reactor bed component further includes at least one rigid structure having a plurality of substantially parallel first structure plates spaced apart from each other by a multiple of the distance d and disposed at the angle $\alpha$, and a plurality of substantially parallel second structure plates secured to and disposed at an opposing angle relative the first structure plates. Each second structure plate has a horizontal extent proximate a lower end thereof to engage an upper edge of a corresponding support plate and at least a number of the first structure plates have a length extending below the horizontal extent in at least partially overlapping relation with adjacent support plates to prevent horizontal movement of the rigid structure relative to the foundation grate in a first direction. The reactor bed component further includes at least one fastener disposed to secure the rigid structure to the foundation grate at least against horizontal movement in a second direction opposite the first direction.

For example and as embodied here, the reactor bed component can define one or more flow paths having a substantially constant cross-sectional area between the foundation gate and the at least one rigid structure. Each support plate can be disposed at an angle $\alpha$ between about 15-45 degrees relative to vertical, and in some embodiments, the angle $\alpha$ can be about 30 degrees relative to vertical. The plurality of substantially parallel first structure plates can be spaced apart a multiple of 1 of the distance d. The opposing angle can be substantially the same as but opposite the angle $\alpha$ relative to vertical. Each support plate can have a width w, and the horizontal extent can have a length approximately equal to the width of the support plate.

In some embodiments, the at least one rigid structure can include a plurality of rigid structures, and each rigid structure can be engaged to at least one adjacent rigid structure. The rigid structure can include a horizontal bar disposed along a top portion thereof to engage the at least one adjacent rigid structure. The at least one fastener can include a plurality of fasteners, and the foundation grate can include a frame member along an edge thereof having a plurality of apertures to receive a corresponding the fastener therein.

Additionally and as embodied here, the reactor bed component can be configured to be joined with one or more adjacent reactor bed components in combination. The combination of reactor bed components when assembled can define a desired shape in plan view, such as a circular shape. The foundation grate can have one or more opened zones defined therein by selected support plates.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

BRIEF DESCRIPTION OF THE DRAWINGS

FIG. 2A is an exploded cross-sectional side view illustrating the reactor bed component taken along line 2-2 of FIG. 1.

FIG. 2B is a cross-sectional side view illustrating the reactor bed component of FIG. 2A as assembled.

FIG. 3A is an exploded cross-sectional side view of an exemplary reactor bed component according to an illustrative embodiment of the disclosed subject matter.

FIG. 3B is a cross-sectional side view illustrating the reactor bed component of FIG. 3A as assembled.

FIG. 3C is a detail view of region 3C of FIG. 3B.

DETAILED DESCRIPTION OF THE PREFERRED EMBODIMENT

Reference will now be made in detail to the various exemplary embodiments of the disclosed subject matter, exemplary embodiments of which are illustrated in the accompanying drawings. The structure and corresponding method of operation of the disclosed subject matter will be described in conjunction with the detailed description of the system.

The disclosed subject matter is generally directed to reactor bed components, as well as systems and methods to secure rigid structures, such as structured packing or stripping sheds, for example in a reactor bed vessel. As embodied herein, the reactor bed vessel can be a fluidized bed reactor or a packed bed reactor having one or more rigid assemblies for use in separating hydrocarbons from a catalyst. Additional details regarding fluidized bed reactors and other aspects of fluidized catalytic cracking (FCC) processes are provided in U.S. Pat. No. 8,349,170 and U.S. Patent Application Publication Nos. 2011/0240526 and 2011/0315603, each of which is incorporated by reference herein in its entirety.

In accordance with the disclosed subject matter herein, the reactor bed component generally includes a foundation grate, one or more rigid structures and one or more fasteners. The foundation grate has a plurality of substantially parallel support plates equally spaced apart from each other by a distance d. The plurality of substantially parallel support plates have a vertical height h, with each support plate disposed at an angle α relative to vertical. Each rigid structure has a plurality of substantially parallel first structure plates spaced apart from each other by a multiple of the distance d and disposed at the angle α, and a plurality of substantially parallel second structure plates secured to and disposed at an opposing angle relative the first structure plates. Each second structure plate has a horizontal extent proximate a lower end thereof to engage an upper edge of a corresponding support plate and at least a number of the first structure plates have a length extending below the horizontal extent in at least partially overlapping relation with adjacent support plates to prevent horizontal movement of the rigid structure relative to the foundation grate in a first direction. Each fastener is disposed to secure the rigid structure to the foundation grate at least against horizontal movement in a second direction opposite the first direction.

Figure 1:
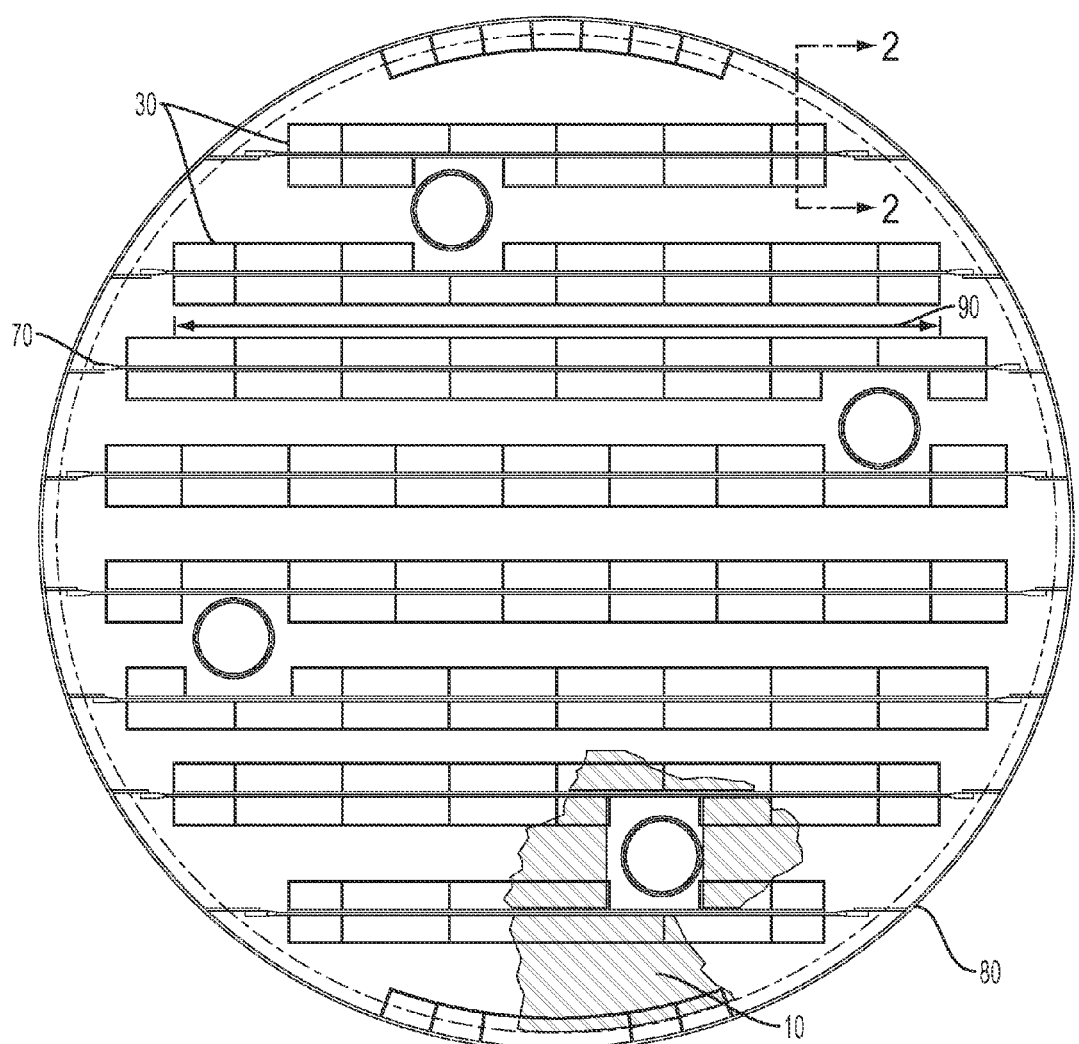
FIG. 1 is a plan view illustrating a conventional reactor bed component for purpose of illustration and comparison to the disclosed subject matter.

The accompanying figures, where like reference numerals refer to identical or functionally similar elements throughout the separate views, serve to further illustrate various embodiments and to explain various principles and advantages all in accordance with the disclosed subject matter. For purpose of comparison, an exemplary embodiment of a conventional support assembly is depicted in FIGS. 1-2B, whereas for purpose of explanation and illustration, and not limitation, exemplary embodiments of the reactor bed component in accordance with the disclosed subject matter are shown in FIGS. 3A-5C. While the present disclosed subject matter is described with respect to a rector bed component for a circular bed reactor in a fluid catalytic cracking process, one skilled in the art will recognize that the disclosed subject matter is not limited to the illustrative embodiment, and that the component can be used to secure any suitable rigid structure in any suitable chamber.

For purpose of comparison to and illustration of the disclosed subject matter, referring to a conventional reactor bed component illustrated in FIGS. 1-2B, a reactor bed component 1000 includes a vane structure 10 supported by a foundation grate 20. In this manner, the foundation grate 20 prevents the vane structure 10 from dropping below an assembled height. As shown for example in FIGS. 2A-2B, a conventional hold-down assembly 30 can be employed to restrict or prevent movement of the vane structure 10 in a direction opposite the foundation grate 20. The hold-down assembly 30 can include at least one plate to form a structural beam 90, which is disposed to secure the top of the vane structure 10. For example, and as depicted in FIG. 1, a plurality of hold-down assemblies 30 may be required to span across the pressure vessel shell 80 in a parallel fashion, covering substantially all of the cross-section of the reactor bed component 1000. The hold-down assembly beams 30 can be joined to the pressure vessel shell 80 at various terminal locations 70. The overall length of structure beams 90 can be varied to maintain an average distance from the pressure vessel shell.

In operation, the reactor bed can experience upward turbulence; that is turbulent force can flow upward through the foundation grate 20 to the vane structure 10. The hold-down assembly 30 therefore is configured to overcome such turbulent force applied to the vane structure 10. Nevertheless, the size and location of the hold-down assembly 30 relative to the vane structure 10 can restrict, block or otherwise interrupt the flow paths 40 through the reactor bed component 100, which as described above, can reduce the performance of the reactor bed.

Furthermore, as shown for example in FIGS. 2A-2B, the foundation grate 20 includes perpendicular plates 22 that, when the reactor bed component 1000 is assembled, abut or engage the angled plates 12 of the vane structure 10. As such, the resulting junctions 50 of the perpendicular plates 22 and the angled plates 12 further restrict or obstruct the flow paths 40.

Additionally, the size of the hold-down assembly 30 consumes internal volume of the reactor bed, and thus can reduce the amount of volume available for catalyst inventory. The presence of the hold-down assembly can also hinder or prevent the ability to inspect, repair or remove the pressure vessel without removing the structural beams 90 from the pressure vessel, and thus can increase cost due to utilization of special rigging equipment and larger vessel access locations for the equipment.

Referring now to an illustrative embodiment of FIGS. 3A-3C, a reactor bed component 1010 includes a foundation grate 110 with parallel support plates 112 equally spaced apart from each other by a distance d. The parallel support plates 112 each extend to a vertical height h, and thus can define a horizontal reference plane through the height h of each parallel support plate. Each parallel support plate is disposed at an angle $\alpha$ relative to vertical. For example and without limitation, each parallel support plate can be disposed at an angle $\alpha$ within a range of about 15 to 45 degrees relative to vertical, and in some embodiments angle $\alpha$ can be about 30 degrees relative to vertical. In this arrangement, the foundation grate 110 can provide a primary support for one or more rigid structures, such as structured packing or stripping sheds, as described further below.

As shown for example in FIGS. 3A-3C, the reactor bed component 1010 includes a rigid structure 100 with substantially parallel first structure plates 102 spaced apart from each other by a multiple of the distance d of the support plates 112 and disposed at the angle $\alpha$ of the parallel support plates. For example and as embodied herein, the multiple of the distance d can be 1, and as such, each first structure plate 102 can be spaced apart a distance d and correspond to a corresponding one of the support plates 112. Alternatively, each first structure plate 102 can be spaced apart by a further multiple of the distance d, such as 2, 3 or any suitable number, and as such, each first structure plate 102 can be spaced apart by each other first structure plate 102 with 2, 3, or any suitable number of support plates 112 disposed therebetween.

Rigid structure 100 further includes substantially parallel second structure plates 104 secured to and disposed at an opposing angle relative the first structure plates 102. As shown for example in FIGS. 4A-4E, and as embodied herein, the first structure plates 102 and second structure plates 104 can be disposed in an interlaced pattern, such that the first structure plates 102 alternate with the second structure plates 104 in a crosswise pattern along the length of the rigid structure 100. Furthermore and as embodied herein, the opposing angle $\alpha'$ of the second structure plates 104 can be equal to angle $\alpha$ of the first structure plates 102, but opposite in orientation relative to vertical. Alternative angles also can be used for the second structure plates 104 if suitable for the intended application.

As depicted in FIGS. 3A-3C, rigid structure 100 can engage foundation grate 110 to restrict or prevent undesired movement of the rigid structure 100 relative to the foundation grate 110. For example, one or more of the second structure plates 104 can include a horizontal extent 106 proximate a lower end thereof, which can engage an upper edge 116 of a corresponding support plate 112 along the horizontal reference plane to prevent downward movement of the rigid structure 100 relative to the foundation grate 110 and thus support the rigid structure 100 thereon. As embodied herein, and as depicted in FIG. 3C, each support plate 112 can have a width w1, and the horizontal extent 106 can have a length approximately equal to the width w1 of the support plate 112, for example to engage substantially all of the upper edge 116 of the corresponding support plate 112, preferably without defining an exposed edge so as to prevent or minimize turbulent flow.

Furthermore, and to prevent horizontal movement in at least one direction, some or all of the first structure plates 102 can have a length 108 extending below the horizontal extent 106, as shown for example in FIG. 3A. As such, and with the horizontal extent 106 supported on the support plates 112, the length 108 of the first structure plates 102 can extend below the horizontal reference plane defined by the upper edges 116, so as to at least partially overlap, and in some embodiments can substantially overlap, with adjacent support plates 112, as shown for example in FIG. 3B. In this manner, the first structure plates 102 disposed at angle $\alpha$ and overlapping with adjacent support plates 112 can prevent upward lift-off of the rigid structure 100 from the foundation grate as well as horizontal movement of the rigid structure 100 relative to the foundation grate 110 in a first direction x1.

Figure 4A:
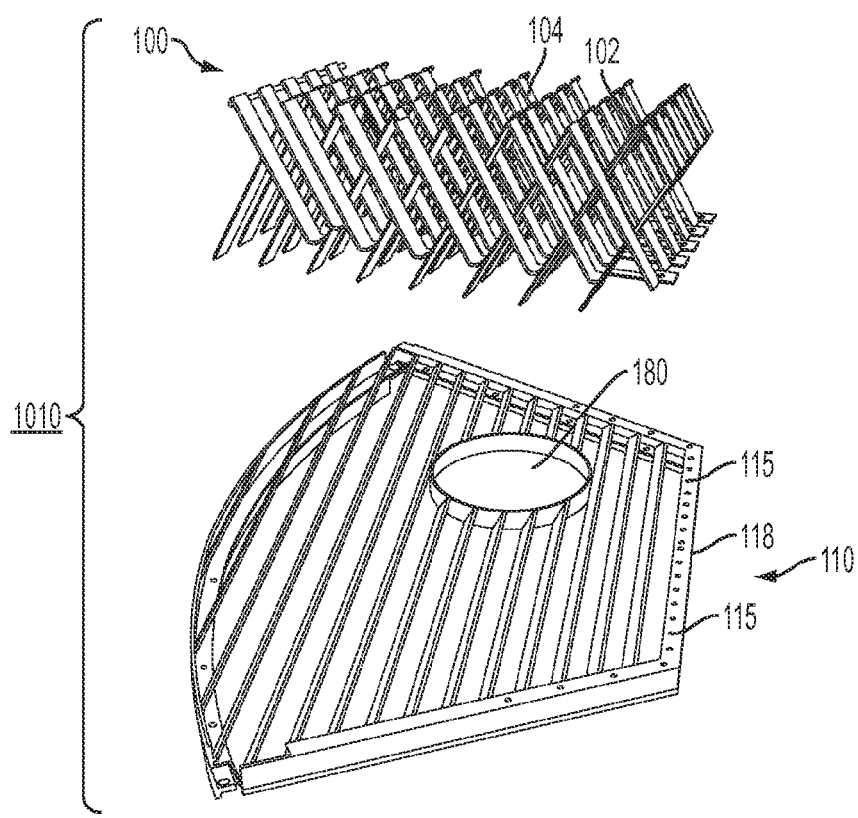
FIG. 4A is an exploded perspective view of the reactor bed component of FIG. 3A.
Figure 4B:
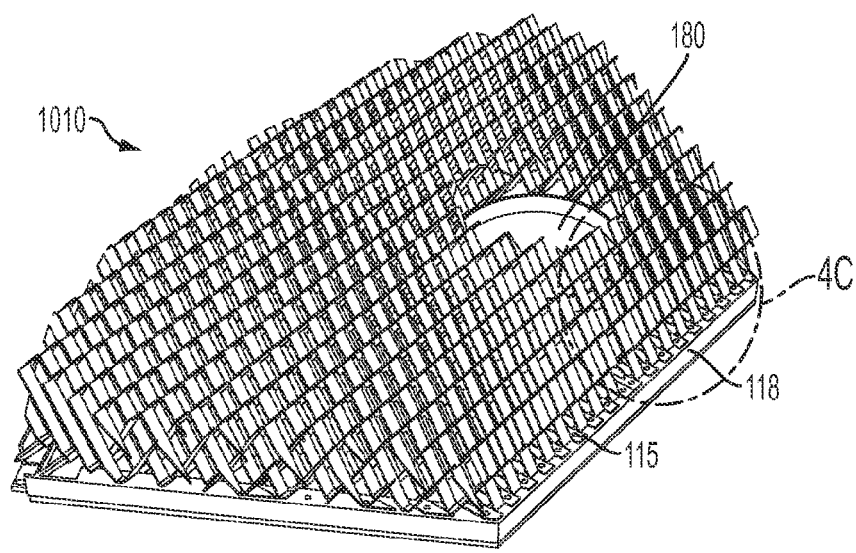
FIG. 4B is an elevated perspective view of the reactor bed component of FIG. 4A as assembled.
Figure 4C:
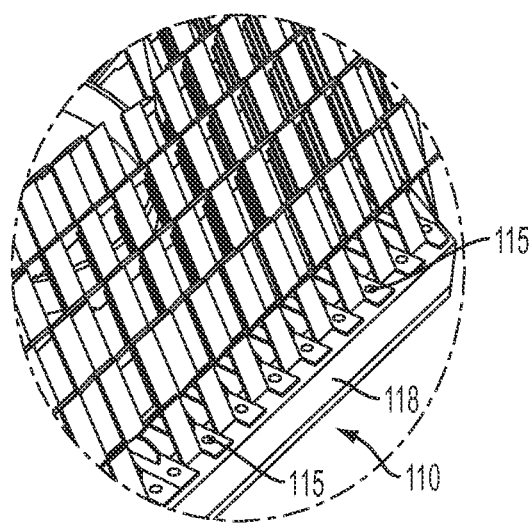
FIG. 4C is a detail view of region 4C of FIG. 4B.
Figure 4D:
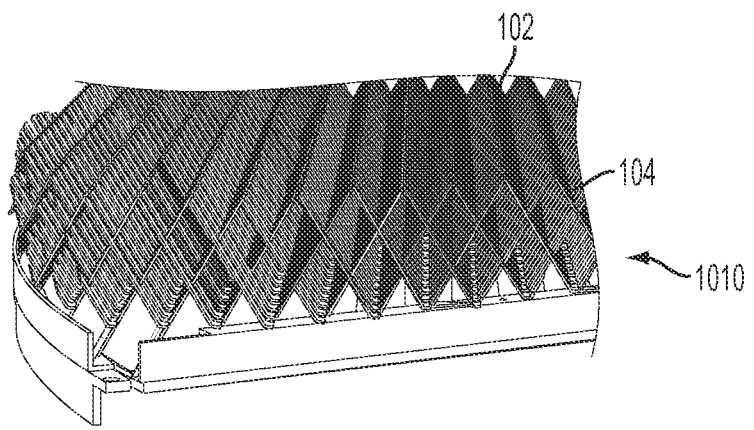
FIG. 4D is an enlarged perspective view of the assembled reactor bed component of FIG. 4B.

As shown for example in FIGS. 3A, 3B and 4A, the foundation grate 110 can include one or more apertures 115 to receive a fastener 120. The fastener 120 is disposed to secure the rigid structure 100 to the foundation grate 110 at least against horizontal movement in a second direction x2 opposite the first direction x1, as depicted in FIG. 3B. For example and as embodied herein and depicted in FIG. 4A, multiple apertures 115 can be disposed substantially in-line along at least one end of the foundation grate 110 to define a fastener alley 118. Likewise, each rigid structure 100 can include one or more apertures 105, for example in one or more horizontal extents 106 disposed at an end of the rigid structure 100 corresponding to the fastener alley 118 of the foundation grate 110. Fastener alley 118 can thus be uniform and in-line and thus allow for easier installation of the fastening hardware, as well as easier inspection of the fastening hardware from above the reactor bed component 1010 compared to conventional components. Additionally or alternatively, apertures 115 can be disposed along one or more additional sides of the foundation grate 110, and each rigid structure can include one or more apertures 105, for example in a horizontal extent 106 disposed along the sides of the rigid structure 100 corresponding to the sides of the foundation grate 110.

Figure 4E:
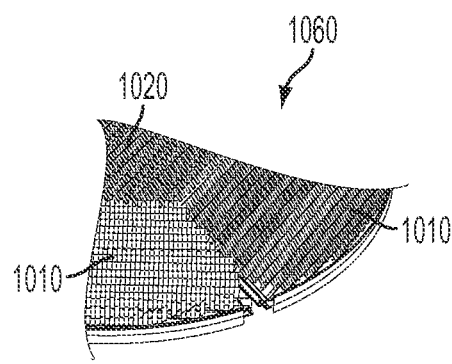
FIG. 4E is an elevated perspective view of an exemplary combination of reactor bed components of FIG. 4A as assembled.

As depicted in FIGS. 4A-4E, and with reference to a reactor bed component 1010 for a reactor bed having a circular shape in plan view as depicted in FIG. 4E, foundation grate 110 can have a substantially trapezoidal frame, with an arcuate frame member joining the legs of the trapezoid at a first end and a straight frame member joining the legs of the trapezoid at a second end opposite the first end. The fastener alley 118 can be disposed along the straight frame member of the foundation grate 110. Additionally or alternatively, apertures 115 for fasteners 120 can be disposed along the sides of the foundation grate and/or along the arcuate frame member of the foundation grate 110. Alternative shapes for the foundation grate 110 and rigid structure 100 also can be provided depending upon the shape of the reactor vessel.

In accordance with the disclosed subject matter, at least one reactor bed component 1010 is disposed within a reactor vessel. However, and as embodied herein, a plurality of reactor bed components 1010 can be provided to be assembled and used in combination. For example, and as illustrated in FIGS. 4A-4E, reactor bed component 1010 can be configured to be joined with one or more adjacent reactor bed components 1010. As depicted in FIG. 4E, the combination of reactor bed components 1010 when assembled can define a cylindrical shape (i.e., a circular shape in plan view). As embodied herein, foundation grate 110 of a reactor bed component 1010 can be joined directly or indirectly to the foundation grate 110 of adjacent reactor bed components 1010 proximate the side legs of the foundation grates 110 of the reactor bed components 1010. In this configuration, each arcuate portion of the foundation grate 110 can define a sector of the resulting circular shape of the combination of reactor bed components, the arcuate foundation grates 110 in combination defining an outer portion of the combination of reactor bed components.

In addition to substantially similar rigid structures 100, each defining a section, one or more additional foundation grates 110 can be provided to form the additional reactor bed components 1010. For example, as depicted in FIG. 4E, one or more inner reactor bed components 1020 can define the inner portion of the combination of reactor bed components. As embodied herein, the foundation grate 110 of the inner reactor bed components 1020 can have a substantially trapezoidal shape with each base and leg being defined by a substantially straight frame member, with each leg and one base abutting the straight-edged bases of the foundation grates 110 of the outer reactor bed components 1010, and the other base abutting a corresponding base of an adjacent inner reactor bed components 1020. For example, and as illustrated in FIG. 4E, the combination 1060 of reactor bed components can include six outer reactor bed components 1020 defining the outer portion of the combination 1060 and two inner reactor bed components 1010 defining the inner portion of the combination 1060. Any combination of components is possible with as few as two components forming the combination. It is possible to use two, three, four, five or more outer reactor bed components. The number and configuration of inner reactor bed components will be determined based upon the number of outer reactor bed components. For example, no inner reactor bed components are necessary when only two outer reactor bed components are utilized. It is also contemplated that the inner reactor bed component(s) may have a circular configuration. With such an arrangement, the outer bed components will have an inner portion to conform to the shaper of the inner reactor bed.

The reactor bed components 1010, 1020 are held in place by their geometry. No additional fasteners are needed. Furthermore, the outer reactor bed components 1010 are held in place within the pressure vessel 80 without welding. The modular combination of the reactor bed components 1010, 1020 can allow for the combination to be manufactured and installed using relatively compact pieces, which can allow for less complicated installation compared to larger conventional systems. Furthermore, the overall reduced complexity of the reactor bed components 1010, 1020 compared to conventional components can provide reduced fabrication, installation, unit maintenance and material costs compared to conventional components.

Additionally, as shown for example in FIGS. 4A-4E, some or all of the reactor bed components 1010, 1020 can each include an opened zone 180 therein. The opened zone 180 can be defined by selected support plates 112 disposed about and/or configured to form the perimeter of the opened zone 180, as shown in FIG. 4A. The opened zone 180 can be further defined by an annular frame member surrounding the opened zone 180 and joined to the selected support plates 112. Furthermore, the rigid structure 100 can be free of structure plates 102, 104 in the area corresponding to the opened zone 180. The opened zone 180 can thus provide access through the reactor bed components 1010, 1020 for additional internal vessel hardware, which can be, for example and without limitation, conduit tubes of cyclones installed in the pressure vessel. The opened zone 180 is not intended to be limited to the annular shape illustrated in the figures; rather, other geometries are contemplated including but not limited to triangular, rectangular, square and other polygons. It is contemplated that such open zones may be utilized, for example, as man way entrances, pipe or conduit passageways, thermal wells and openings for other components associated with fluid bed technologies.

Figure 5A:
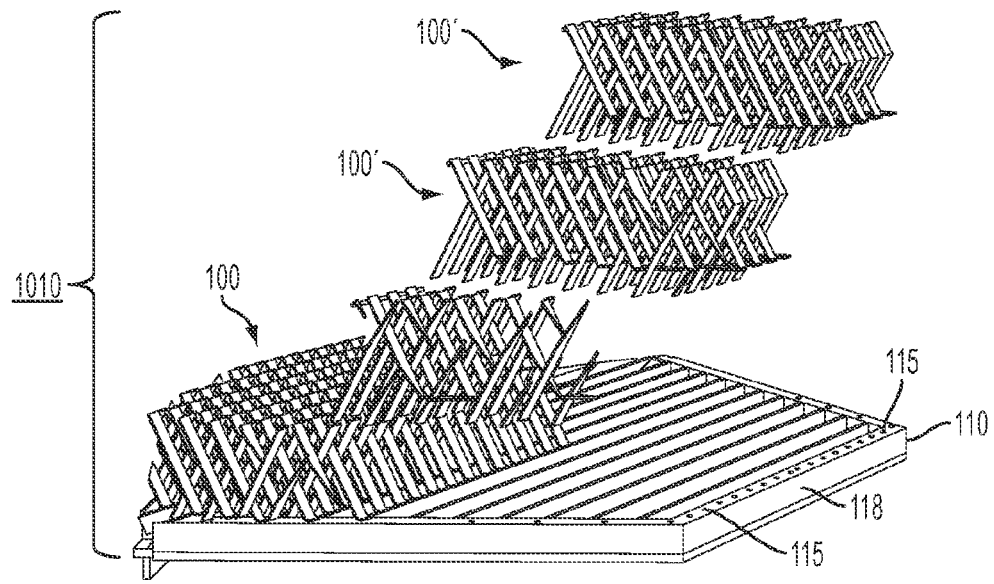
FIG. 5A is a side perspective view illustrating assembly of the reactor bed component of FIG. 3A.
Figure 5B:
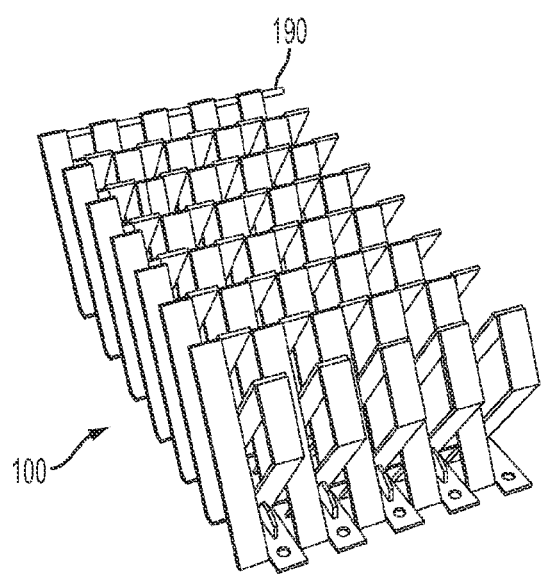
FIG. 5B is an elevated perspective view of an exemplary rigid structure of the reactor bed component of FIG. 3A.
Figure 5C:
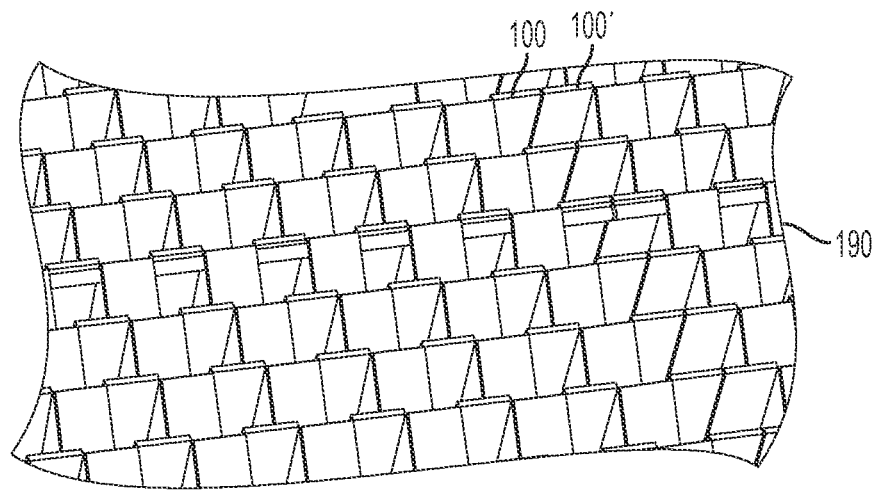
FIG. 5C is a partial front view of adjacent exemplary rigid structures of the reactor bed component of FIG. 5A.

As depicted in FIGS. 5A-5C, the at least one rigid structure 100 can include a plurality of rigid structures 100. Each rigid structure 100 can be engaged to at least one adjacent rigid structure 100. For example, a horizontal bar 190 can be disposed along an end of a rigid structure 100. In this manner, an outer set of rigid structures 100 can be installed and secured sequentially to the foundation grate 110 as depicted in FIG. 5A and as discussed herein. An inner set of rigid structures 100' can then be installed and secured to the outer set of rigid structures 100 by installing horizontal bar 190 along an end of the inner rigid structures 100'.

Referring again to FIGS. 3A-3C, the reactor bed component 1010 defines flow paths 140, 150 through the foundation grate 110 and up through the rigid structure 100. The flow paths 140, 150 can have a substantially uniform width w2 throughout the flow path. In this manner, pressure drops across the flow paths 140, 150 of the reactor bed component 1010, and thus the overall pressure vessel system, can be reduced, which can improve the yield of stripped catalyst through the stripping zone of the pressure vessel.

The rigid structure 100 and foundation grate 110 and consequently the reactor bed component 1010 formed therefrom are preferably formed from metal (preferably the same material as the surrounding vessel such that the components have similar coefficients of expansion). In cold flow testing applications, it is contemplated that the components may be formed from plastic.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

The assembly described herein can be utilized in any reactor system or process for petrochemical refinement utilizing fluid bed technology. It is contemplated that the presently disclosed subject matter may be used in connection with various fluid bed technologies including but not limited to (i) the preparation of at least one of phthalic anhydride, vinyl acetate, acrylonitrile, ethylene dichloride, chloromethane, maleic anhydride, polyethylene, polypropylene and o-cresol; (ii) Fischer-Tropsch synthesis; (iii) resid cat cracking; (iv) the conversion of at least one methanol to olefins (MTO), methanol to aromatics (MTA), methanol to paraxylene (MTP), methanol to gasoline (MTG), Methanol to diesel (MTD), syngas to olefins, syngas to aromatics, syngas to paraxylene, coal to olefins. coal to aromatics, Benzene and/or Toluene Methylation with Methanol or DME to Aromatics, Benzene and/or Toluene Methylation with Methanol or DME to Paraxylene, Toluene Ethylation to MEB (methylethylbenzene), Benzene Ethylation to DEB (Diethylbenzene), Biomass to Olefins, Biomass to Aromatics, and Biomass to Gasoline.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

ADDITIONAL EMBODIMENTS

Embodiment 1

A reactor bed component, comprising: a foundation grate having a plurality of substantially parallel support plates equally spaced apart from each other by a distance d, the plurality of substantially parallel support plates each having a vertical height h, each support plate disposed at an angle $\alpha$ relative to vertical; at least one rigid structure having a plurality of substantially parallel first structure plates spaced apart from each other by a multiple of the distance d and disposed at the angle $\alpha$, and a plurality of substantially parallel second structure plates secured to and disposed at an opposing angle $\alpha'$ relative the first structure plates, each second structure plate having a horizontal extent proximate a lower end thereof to engage an upper edge of a corresponding support plate and at least a number of the first structure plates having a length extending below the horizontal extent in at least partially overlapping relation with adjacent support plates to prevent horizontal movement of the rigid structure relative to the foundation grate in a first direction; and at least one fastener disposed to secure the rigid structure to the foundation grate at least against horizontal movement in a second direction opposite the first direction.

Embodiment 2

The reactor bed component of Embodiment 1, wherein reactor bed component defines one or more flow paths having a substantially constant cross-sectional area between the foundation gate and the at least one rigid structure.

Embodiment 3

The reactor bed component of Embodiments 1 or 2, wherein the angle $\alpha$ is between about 15-45 degrees relative to vertical.

Embodiment 4

The reactor bed component of Embodiment 3, wherein the angle $\alpha$ is about 30 degrees relative to vertical.

Embodiment 5

The reactor bed component of anyone of Embodiments 1-4, wherein the plurality of substantially parallel first structure plates are spaced apart a multiple of 1 of the distance d.

Embodiment 6

The reactor bed component of anyone of Embodiments 1-5, wherein the opposing angle $\alpha'$ is substantially the same as but opposite the angle $\alpha$ relative to vertical.

Embodiment 7

The reactor bed component of anyone of Embodiments 1-6, wherein each support plate has a width w, and further wherein the horizontal extent has a length approximately equal to the width of the support plate.

Embodiment 8

The reactor bed component of anyone of Embodiments 1-7, wherein the at least one rigid structure comprises a plurality of rigid structures, each rigid structure engaged to at least one adjacent rigid structure.

Embodiment 9

The reactor bed component of Embodiment 8, wherein the rigid structure includes a horizontal bar disposed along a top portion thereof to engage the at least one adjacent rigid structure.

Embodiment 10

The reactor bed component of anyone of Embodiments 1-9, wherein the at least one fastener includes a plurality of fasteners, the foundation grate comprising a frame member along an edge thereof, the frame member having a plurality of apertures to receive a corresponding the fastener therein.

Embodiment 11

The reactor bed component of anyone of Embodiments 1-10, wherein the reactor bed component is configured to be joined with one or more adjacent reactor bed components in combination.

Embodiment 12

The reactor bed component of Embodiment 11, wherein the combination of reactor bed components when assembled defines a circular shape in plan view.

Embodiment 13

The reactor bed component of anyone of Embodiments 1-12, wherein the foundation grate has an opened zone defined therein by selected support plates.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A reactor bed component, comprising:
a foundation grate having a plurality of substantially parallel support plates equally spaced apart from each other by a distance d, the plurality of substantially parallel support plates each having a vertical height h, each support plate disposed at an angle $\alpha$ relative to vertical;
at least one rigid structure having a plurality of substantially parallel first structure plates spaced apart from each other by a multiple of the distance d and disposed at the angle $\alpha$, and a plurality of substantially parallel second structure plates secured to and disposed at an opposing angle $\alpha'$ relative the first structure plates, each second structure plate having a horizontal extent proximate a lower end thereof to engage an upper edge of a corresponding support plate and at least a number of the first structure plates having a length extending below the horizontal extent in at least partially overlapping relation with adjacent support plates to prevent horizontal movement of the rigid structure relative to the foundation grate in a first direction; and
at least one fastener disposed to secure the rigid structure to the foundation grate at least against horizontal movement in a second direction opposite the first direction.

2. The component of claim 1, wherein reactor bed component defines one or more flow paths having a substantially constant cross-sectional area between the foundation gate and the at least one rigid structure.

3. The component of claim 1, wherein the angle $\alpha$ is between about 15-45 degrees relative to vertical.

4. The component of claim 3, wherein the angle $\alpha$ is about 30 degrees relative to vertical.

5. The component of claim 1, wherein the plurality of substantially parallel first structure plates are spaced apart a multiple of 1 of the distance d.

6. The component of claim 1, wherein the opposing angle $\alpha'$ is substantially the same as but opposite the angle $\alpha$ relative to vertical.

7. The component of claim 1, wherein each support plate has a width w, and further wherein the horizontal extent has a length approximately equal to the width of the support plate.

8. The component of claim 1, wherein the at least one rigid structure comprises a plurality of rigid structures, each rigid structure engaged to at least one adjacent rigid structure.

9. The component of claim 8, wherein the rigid structure includes a horizontal bar disposed along a top portion thereof to engage the at least one adjacent rigid structure.

10. The component of claim 1, wherein the at least one fastener includes a plurality of fasteners, the foundation grate comprising a frame member along an edge thereof, the frame member having a plurality of apertures to receive a corresponding the fastener therein.

11. The component of claim 1, wherein the reactor bed component is configured to be joined with one or more adjacent reactor bed components in combination.

12. The component of claim 11, wherein the combination of reactor bed components when assembled defines a circular shape in plan view.

13. The component of claim 1, wherein the foundation grate has an opened zone defined therein by selected support plates.

* * * * *